UNITED STATES PATENT OFFICE.

THOMAS JONES, OF DENVER, COLORADO, ASSIGNOR TO MARY S. JONES, OF SAME PLACE.

PROCESS OF MANUFACTURING RELIEF GEOGRAPHICAL MAPS OR GLOBES.

SPECIFICATION forming part of Letters Patent No. 431,469, dated July 1, 1890.

Application filed October 12, 1888. Serial No. 287,956. (No model.)

*To all whom it may concern:*

Be it known that I, THOMAS JONES, a citizen of the United States of America, residing at Denver, in the county of Arapahoe and State of Colorado, have invented a certain new and useful Process of Manufacturing Relief Geographical Maps or Globes, of which the following is a specification.

My invention relates to a new method or process for the manufacture of geographical relief or topographical maps, or maps wherein the topography of the land-sections is represented in relief and the water-spaces cut away or depressed, so that such spaces may be shown as adapted to hold water and be made in fact sheets of water. It is well known that such maps are exceedingly desirable, and are valuable adjuncts in that most desirable method of teaching—object-teaching; and this is so for several reasons. The boundaries and outlines and configuration of the greater and lesser subdivisions of the globe, of the hemispheres, continents, countries, oceans, seas, lakes, &c., may be defined and illustrated by the presence, and that in their exact geographical relations, of the actual water-bodies, making a more vivid and lasting impression upon the mind of the student than would the inspection or study of a mere flat map or plain ordinary globe. Again, when such a map is used with the water-spaces filled with water, the water is available for instruction and amusement, in that actual vessels of the various styles employed in commerce may be used thereon laden with the representations of various commodities and transporting them from country to country upon the water, and object-lessons be thus given of the trade of various countries, the imports and exports, and the trend generally of international and interstate commerce, and such vessels may also be made instrumental in illustrating the use of the needle and the general principles of navigation. The depressed portions may show or be made to show the general configuration of the beds of the great water-basins of the earth, their apparent geological structure, the paths of cables, &c., and such map, when not used with water, may be suspended and used as an ordinary wall-map, giving, even in such location, a clearer, better defined, and more accurate impression than would a mere flat map or plain globe. Such a map is illustrated and embodied in Letters Patent No. 155,449, issued to George E. Jones, M. D., September 29, 1874, and, for the reasons stated, has met with great commendation from such geographers and educators as have examined maps made according to that patent. The lack, however, of any comparatively cheap or commercially practicable and feasible method of producing and duplicating such maps has prevented their general introduction to and use by the public and in schools, seminaries, colleges, &c., where their use is desirable and would be highly advantageous.

The object of my invention, therefore, is to furnish a process or method by which relief-maps, and especially such as are shown and described in the patent referred to, may be readily and comparatively cheaply made and reproduced, the cost thereof being so reduced that their general introduction and use may be commercially feasible and the advantages thereof generally availed of; to which ends the invention consists in the matters more particularly hereinafter described and claimed.

In practicing my new method of producing such maps it may be stated, generally, that the important steps are to form or procure a good topographical or relief map of the section to be represented (the whole world or any desired part thereof) and from it to next form directly or through an intermediate molding a mold of such part, and then to force or compress into such mold any suitable plastic material, which is thereby formed into a shape which is a fac-simile reproduction of the original model. Such fac-simile may be properly colored to indicate vegetation and desert, deep and shallow waters, &c. Going now into detail, all this is accomplished as follows: The first step is to obtain an accurate representation or topographical model for the map to be produced, an initial relief-map itself. This may be done by modeling such a map in plastic material or by carving or cutting the same out of rigid material, or by treating sheet metal by hammering up or repoussé work. To insure, however, the greatest accuracy with the greatest economy, the following mode of procedure is to be preferred. Upon a suitable-sized smooth board or slab or sheet of adequate thickness a plain flat map is accurately delineated, and this may be easiest done by pasting or cementing thereto a drawn or printed paper map, thus placing on the board an easily-followed flat delineation for the map. The board is then divided according to the land and water boundaries, and this may be the most readily, quickly, and accurately done by the use of a fine saw—as a thread, jig, or fret saw—sawing out first the larger islands and islands of appreciable size, then the other lands, following closely the coast-lines thereof, and sawing in properly for the rivers. This in effect then gives a dissected board map, dissected on the divisional lines of land and water, a map divided into a water part and a land part. Upon a backing of suitable size and rigidity—as, for instance, a base of boards—these parts are then placed, the water part being temporarily secured thereto, and the land portion, including the islands cut out, permanently fixed thereto, the water portion furnishing a guide by which the land portions are enabled to be secured in exactly their proper positions and relations. If, as often happens, there are islands which were too small to be cut out, appearing as a mere speck on the water, small holes are drilled thereat through the board map and into the base, and small pins or pegs are inserted therethrough into the base. The water parts are then removed from the base, around which at this time or before or subsequently an edging or guard or rail should be placed at least as high as the general plane of the land part. There is now upon the base a map in two general planes or levels, one of land and the other of water. The bed of the latter may then be topographically treated by cutting away portions in proportion to and to indicate the varying depths and conformation of the bed or by modeling thereon wax or gum or plastic material for the same purpose, and the land part is similarly treated to represent its topography, and the edges of the small pin or peg islands are similarly fashioned into shape. The result is an initial model-map preserving accurately the contour of the flat map, but having added thereto all the showable general topographical features of land and sea. From this a mold is now formed, of material sufficiently rigid and strong to withstand considerable pressure—a metal mold, preferably, as possessing such characteristic. This molding may be done by galvano-plasty, the surface of the model being rendered conducting, and a metal shell then deposited thereon, such shell being then backed up by a sufficient thickness of metal, or a metal mold may be cast directly from such model. This mold may then be bent into circular shape, as the periphery of a cylinder, or it may be used as a plane-bed. Into this mold any suitable plastic material is then forced, the plastic material taking the shape thereof and reproducing in reverse thereof and exactly as the original mold-map, the elevations and depressions, the surface characteristics. This gives a map having a solid body, upon which are built up the elevated portions, such solid body being of advantage, in that greater rigidity and less liability to warpage are secured. If, however, such solid body is not desired, but a hollow back, on account of greater economy of material, both molds are used, either in cylindrical or flat shape, and the material pressed between them.

By this method of procedure such relief-maps as those described in the patent referred to may be readily and cheaply produced and with absolute accuracy, the land and water being in exactly correct relations to each other, and with correct relations of longitude and latitude, showing at a glance, and in a way to most thoroughly impress the student, all the peculiarities of the part of the earth represented in the map.

This process may also be applied to the manufacture of relief-globes, the sections thereof being formed in the manner set forth and then united in the usual way to form the complete globe.

Having thus described my invention, what I claim is—

1. The process of making relief geographical maps or globes herein described, consisting in dividing a slab or sheet into two portions, one comprising the water and one the land portions of the map, securing the latter to a base, so that the latter has elevated portions representing the land and cut-away portions representing the water, and then from it forming a mold, and then forcing or compressing a plastic material into such mold, substantially as set forth.

2. The process of making relief geographical maps or globes herein described, consisting in delineating upon a slab or sheet the water and land boundaries, rivers, islands, and other geographical features, then dividing such slab or sheet along the divisional-lines of land and water into a water portion or portions and a land portion or portions, then securing the latter to a plane base, having thus elevated land portions and depressed or cut-away water portions, then forming therefrom a mold, and lastly forcing or compressing a plastic material into such mold, substantially as set forth.

3. The process of making relief-maps, which consists in delineating the boundary-lines on a slab or board, cutting said slab on said lines, so as to sever the land from the water, rearranging the severed portions in their proper relative positions on a suitable base or foundation, securing the land-divisions to the said base, removing the water-divisions, and modeling the topography of the elevated and depressed surfaces thus formed, substantially as set forth.

In testimony whereof I affix my signature in presence of two witnesses.

THOMAS JONES.

Witnesses:
Z. F. WILBER,
W. P. KNEELAND.